United States Patent [19]
Matsunaga

[11] Patent Number: 5,191,415
[45] Date of Patent: Mar. 2, 1993

[54] STILL IMAGE TRANSMITTING METHOD
[75] Inventor: Osamu Matsunaga, Kanagawa, Japan
[73] Assignee: Sony Corporation, Tokyo, Japan
[21] Appl. No.: 687,509
[22] Filed: Apr. 19, 1991
[30] Foreign Application Priority Data
 Apr. 20, 1990 [JP] Japan ................... 2-02802
 Jun. 28, 1990 [JP] Japan ................... 2-68506
[51] Int. Cl.$^5$ .................... H04N 7/12; H04N 7/04
[52] U.S. Cl. .................................. 358/138; 358/141
[58] Field of Search ...................... 58/138, 141, 12
[56] References Cited
 U.S. PATENT DOCUMENTS
 4,675,733  6/1987  Tanimoto ..................... 358/138
 4,884,136 11/1989  Ninomiya et al. ............ 358/136
 4,942,466  7/1990  Sandbank et al. ............ 358/138
 4,943,858  7/1990  Kitaura et al. ............... 358/167
 5,003,389  3/1991  Isobe et al. .................. 358/140

Primary Examiner—John K. Peng
Attorney, Agent, or Firm—Lewis H. Eslinger; Jay H. Maioli

[57] ABSTRACT

A still image transmitting system using a bandwidth compression method (MUSE) for transmitting a video image signal of a wideband used practically in the high definition television system (HDTV) employs a transmitting method such that the number of fields of transmitted image is increased to two times that in the conventional still image mode so that the resolution in the diagonal direction is improved without increasing the transmission bandwidth.

1 Claim, 5 Drawing Sheets

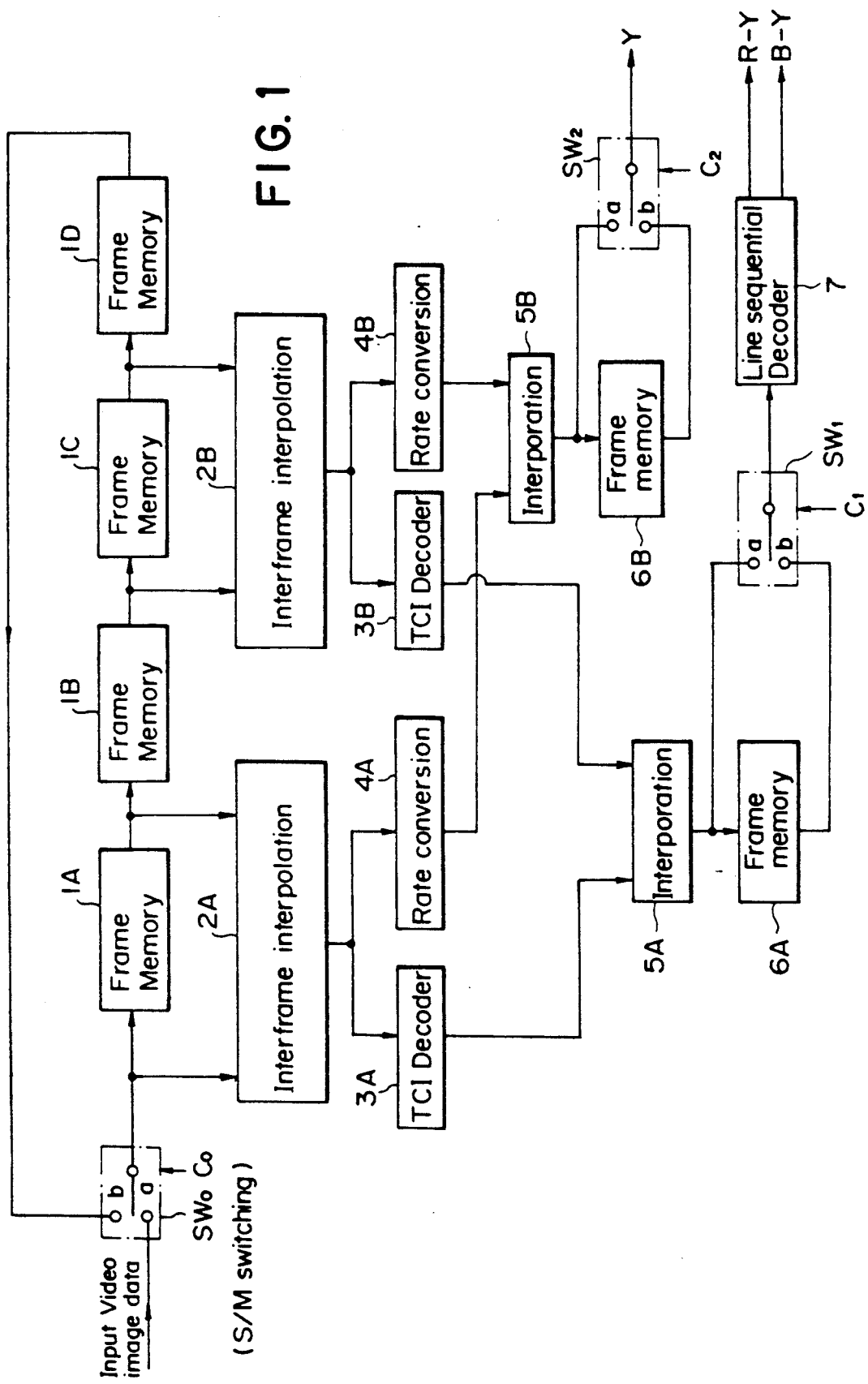

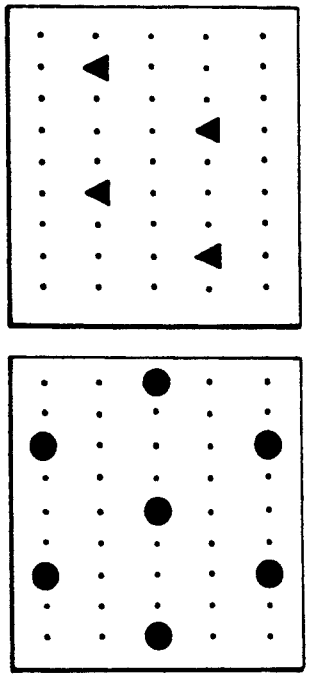
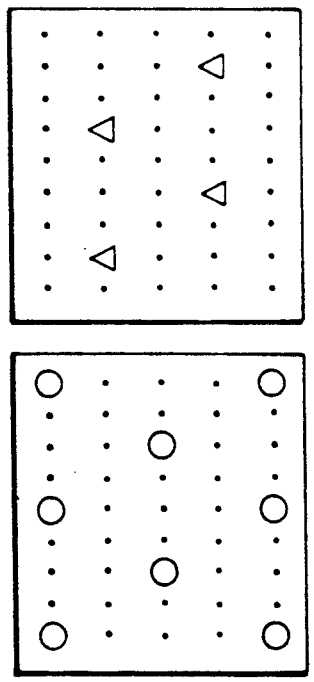
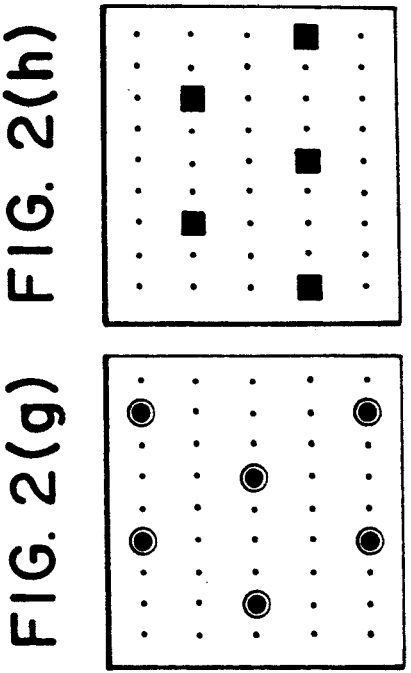
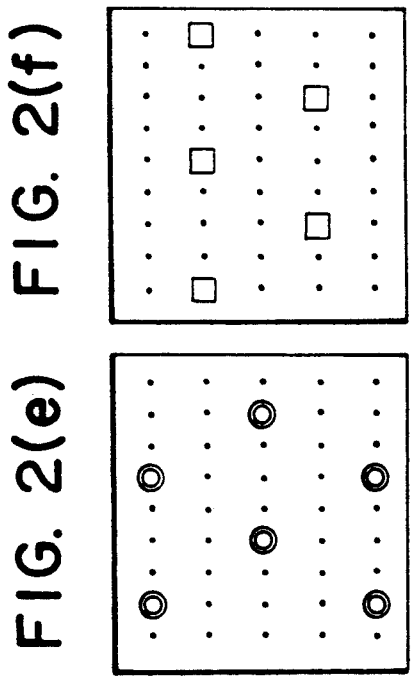

| Field timing | Frame delay portions | | | | Switch portions |
|---|---|---|---|---|---|
| ① | 1 | 3 | 5 | 7 | a |
| ② | 2 | 4 | 6 | 8 | a |
| ③ | 3 | 5 | 7 | 1 | b |
| ④ | 4 | 6 | 8 | 2 | b |
| ⑤ | 5 | 7 | 1 | 3 | a |
| ⑥ | 6 | 8 | 2 | 4 | a |
| ⑦ | 7 | 1 | 3 | 5 | b |
| ⑧ | 8 | 2 | 4 | 6 | b |
| ① | 1 | 3 | 5 | 7 | a |
| ② | · | · | · | · | a |
| · | · | · | · | · | |

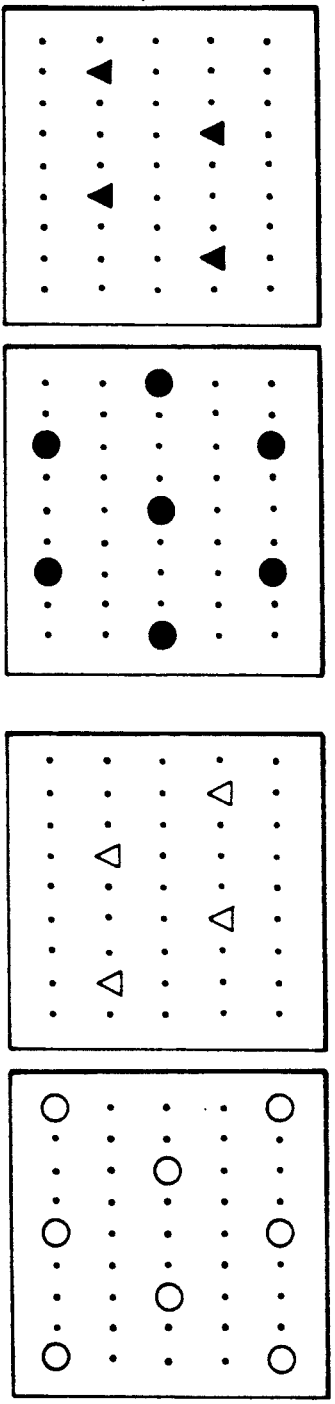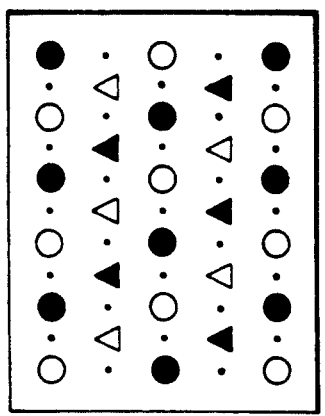

5,191,415

STILL IMAGE TRANSMITTING METHOD

BACKGROUND OF THE INVENTION

1. Field of the Invention

The present invention relates to a still image transmitting method suitable for use in transmitting and receiving a video image signal of a wide band through a transmission line of a narrow band employing a bandwidth compression technique.

2. Description of Related Art

MUSE (Multiple Sub-Nyquist Sampling Encoding) is a system developed as a transmitting method for high-definition television (HDTV) broadcasting with the use of a satellite. The MUSE system is such that it enables a video image signal, whose resolution as visually sensed is kept from worsening by means of digital processing and bandwidth compression, to be transmitted with the use of a narrow band (8.1 MHz).

In the MUSE system, different signal processing is applied to the moving picture portion and to the still picture portion of the video image signal to be transmitted and the signal is transmitted at the rate of one for four sampling points.

One picture area of video image is formed of one field in the moving picture portion, whereas the same is formed of four fields in the still picture portion.

More specifically, in the case of the still video image transmission, first, the image data ○ shown in FIG. 7(a), which is image data sub-sampled at the rate of one for four sampling points, is transmitted and, then, the data Δ in the even field shown in FIG. 7(b) is transmitted as the second-field data.

Further, as shown in FIG. 7(c), the image data ● in the odd field is transmitted as the third-field data and, then, as shown in FIG. 7(d), the image data ▲ in the even field is transmitted as the fourth-field data.

The receiver side, upon receipt of the image data of four fields, synthesizes a first-field signal by generating an interpolated signal from the image data ○ and ● and simultaneously generates a second field signal by obtaining an interpolated signal from the image data Δ and ▲.

Through such signal processing, the monitor of the received video image signal is enabled to display a monitor screen in which the image data of four fields are arranged as shown in FIG. 7(e).

In FIG. 7(e), the points correspond to the image data generated through interpolation between fields. In the case of a still video image, there is no possibility of afterimage to be caused by the interpolation between fields.

However, the interpolated data are contiguous in the diagonal direction. Therefore, the resolution in the diagonal direction is lowered to ½ approximately, and thus there has been a problem that the worsening of resolution becomes noticeable in a still video image.

SUMMARY OF THE INVENTION

The present invention has been made to solve the problem as described above. Accordingly, an object of the present invention is to provide a still image transmitting method in which the number of fields of transmitted image is increased to two times that in the conventional still image mode so that the resolution in the diagonal direction is improved without increasing the transmission bandwidth.

According to the present invention, there is provided a still image transmitting method employing an in image transmitting system using a bandwidth compression method (MUSE) for transmitting a video image signal of a wideband used practically, for example, in the high definition television system (HDTV), such that some image data, which were not transmitted in the conventional still image transmitting method, are transmitted, whereby the reduction in resolution occurring in the conventional still image transmission, especially in the diagonal direction, is prevented from occurring.

BRIEF DESCRIPTION OF THE DRAWINGS

FIG. 1 is a block diagram showing a receiving circuit system applied to a still image transmitting method according to the present invention;

FIGS. 2(a)-2(h), 3(a)-3(c), 4(a)-4(c) and FIG. 5 are diagrams for explaining interpolation processing of image data;

FIG. 6 is a diagram of processed data for explaining the operating timing of switches; and FIGS. 7(a)-7(e) are diagrams explaining conventional still video image data.

DESCRIPTION OF THE PREFERRED EMBODIMENTS

FIG. 1 is a block diagram showing an outline of a receiving circuit system of a video image signal applied to a still image transmitting method of the present invention.

Referring to FIG. 1, reference character $SW_0$ denotes a mode switch controlled, upon receipt of a still video image transmitting mode signal, not shown, to accept image data for eight fields, and then, to have its contact turned to the side b. 1A-1D denote frame delay blocks formed of frame memories or the like.

Reference numerals 2A and 2B denote interframe interpolation blocks for interframe-interpolating image data successively output from the frame delay blocks 1A-1D, 3A and 3B denote TCI decoders for expanding the time base of a chroma signal (C signal) transmitted in accordance with the MUSE system, and 4A and 4B denote rate conversion blocks for converting the sampling frequency of the luminance signal (Y signal) transmitted in accordance with the MUSE system.

Reference numeral 5A denotes a C signal interpolation block for interframe-interpolating C signals obtained from the TCI decoders 3A and 3B, while 5B denotes a Y signal interpolation block for interframe-interpolating the Y signals obtained from the rate conversion blocks 4A and 4B.

Reference numerals 6A and 6B denote memories for delaying a one-frame period. Both inputs and outputs of these delay memories 6A and 6B are supplied to contacts a and b of changeover switches $SW_1$ and $SW_2$, respectively. These switches $SW_1$ and $SW_2$ are switched over in a later described sequence specified by control data $C_1$ and $C_2$, which are supplied thereto in a still video image transmitting mode.

Reference numeral 7 denotes a line sequential decoder employed in the HDTV system for sequentially arranging the C signals.

FIG. 2 is a diagram showing field image data transmitted in the still image transmitting method of the present invention.

Of these field image data, the first, third, fifth, and seventh fields shown in FIG. 2(a), FIG. 2(c), FIG. 2(e) and FIG. 2(g) indicate image data obtained by sampling the first, odd field of the HDTV signal, in which marks ○, ●, ⊙, ⊚ indicate pixel data at sampling points in different positions.

The second, fourth, sixth, and eighth fields shown in FIG. 2(b), FIG. 2(d), FIG. 2(f) and FIG. 2(h) indicate image data obtained by sampling the even field of the same signal, in which marks Δ, ▲, □, ■ indicate pixel data at sampling points in different positions.

In the still image transmitting method of the present invention, when the mode is changed to the still video image transmitting mode, the above described image data of the first field to the eighth field are sequentially transmitted from the transmitter side and these image data are sequentially accepted, through the switch $SW_0$, by the frame delay blocks 1A to 1D in FIG. 1 showing the still video image processing blocks on the receiver side.

The switch $SW_0$ is turned to the side of the contact b after the image data for eight fields have been stored in the frame delay blocks 1A to 1D. Then, at a point of time, the image data of the first and the third fields are supplied to the interframe interpolation block 2A and the image data of the fifth and the seventh fields are supplied to the interframe interpolation block 2B.

Figures 3A, 3B, 3C, 4A, 4B, 4C, 5:
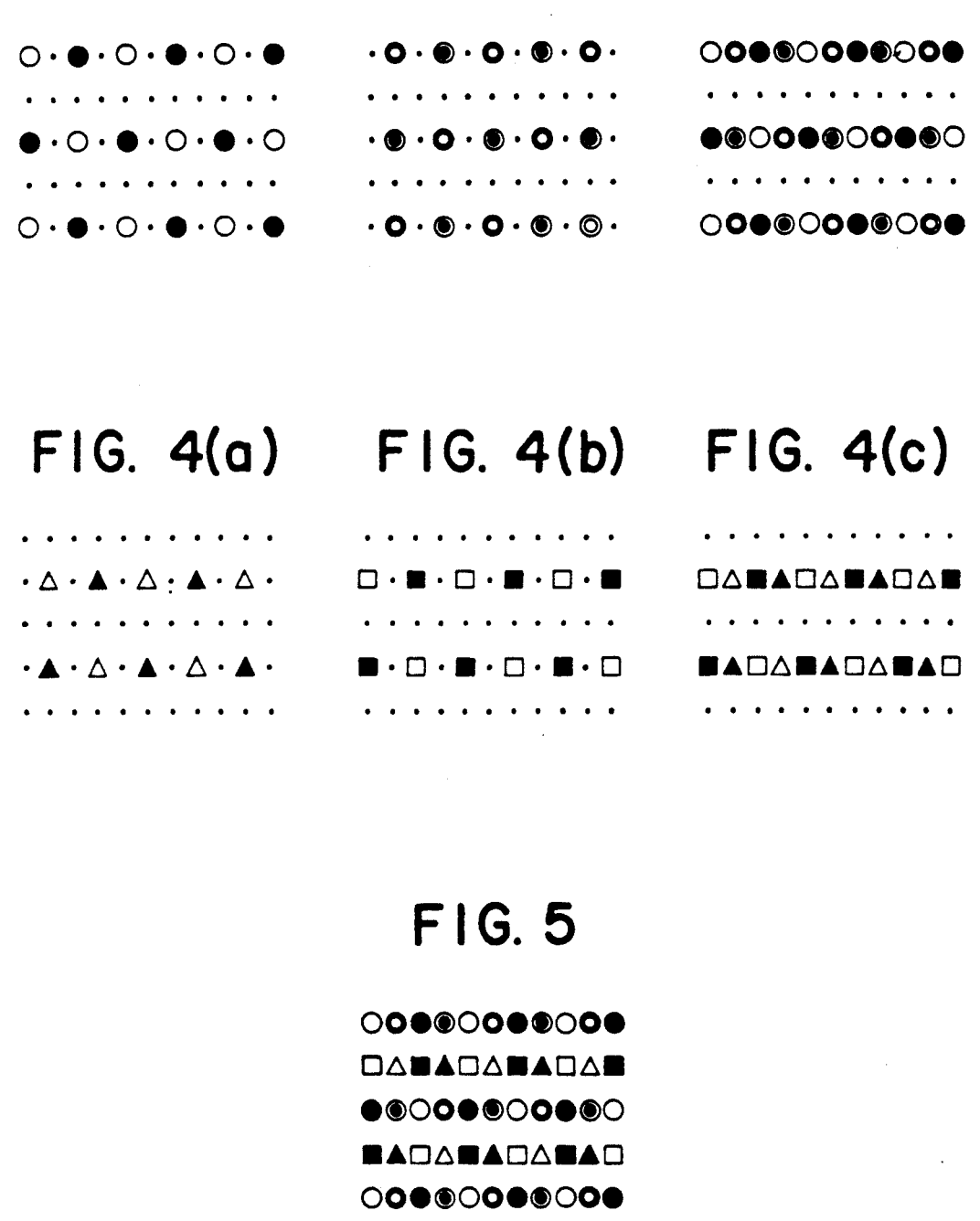

In the interframe interpolation block 2A, the image data of the first and the third fields (○, ●) are subjected to interframe interpolation and an interframe-interpolated signal as shown in FIG. 3(a) is generated.

Similarly, in the interframe interpolation block 2B, the image data of the fifth and the seventh fields (⊙, ⊚) are subjected to interframe interpolation and an interframe-interpolated signal as shown in FIG. 3(b) is generated.

Of these interframe-interpolated signals, those of the C signal are supplied to the TCI decoders 3A and 3B and those of the Y signal are supplied to the rate conversion blocks 4A and 4B.

First, the Y signals (data) supplied to the rate conversion blocks 4A and 4B are subjected to interframe interpolation in the Y signal interpolation block 5B, and, as a result, the video image data in the received odd-field signals are synthesized into video image data arranged as shown in FIG. 3(c).

The video image data in this arrangement is output through the contact a of the switch $SW_2$.

In the next field, the frame delay blocks 1A to 1D supply data of the second and fourth fields and the sixth and eighth fields (Δ, ▲ ; □, ■) to the interframe interpolation blocks 2A and 2B, respectively.

At this timing of the even frame, the same as in the signal processing of the odd frame, video image data as shown in FIG. 4(a) and FIG. 4(b) are respectively output from the interframe interpolation blocks 2A and 2B, and these video image signals are then subjected to interframe interpolation in the Y signal interpolation block 5B so that video image data in the arrangement as shown in FIG. 4(c) is generated.

The video image data as shown in FIG. 4(c) is output through the contact a of the switch $SW_2$ as picture image data for the even field.

Accordingly, subjecting the image data as shown in FIG. 3(c) and FIG. 4(c) to interlaced scanning, the monitor screen makes a display as shown in FIG. 5.

Since, in this displayed picture area, the pixels are each formed of video image data transmitted from the transmitter side, a still video image with high resolution can be obtained.

As for the C signal, since similar signal processing is performed on the C signals output from the frame delay blocks 1A to 1D, a chroma signal improved in its resolution in the diagonal direction over that conventionally obtained is output from the line sequential decoder 7.

At the timing ③ of the next field, as shown in FIG. 6, the video image data formed of those of the third field and the fifth field become the interframe-interpolated data output from the interframe interpolation block 2A, while the video image data formed of those of the seventh field and the first field become the interframe-interpolated data output from the interframe interpolation block 2B.

Then, at the timing of this field, the position of the interpolated data becomes different and, hence, the arrangement of the still video image data becomes different from that in the preceding frame. (This holds also for the timing ④ of the next field, at which the data of the even field come in.)

Therefore, in the embodiment of the present invention, the switches $SW_1$ and $SW_2$ are controlled to select the contacts b, for example, during the interpolating periods at the timing ③ and ④ so that the interpolated video image data at the timing one frame before may be output.

FIG. 6 shows a series of image data output from the frame delay blocks 1A to 1D at intervals of one field, and corresponding timing of the selection made by the switches $SW_1$ and $SW_2$. After all, the switches $SW_1$ and $SW_2$ are switched between the contacts a and b at one-frame intervals.

Although what is described above is the case where still video image data for eight fields are read into the frame delay blocks 1A to 1D and, when the mode is turned into the still video image transmitting mode, corresponding signal processing is performed dynamically, it is also possible to arrange, using a large-capacity field memory, such that the image data stored in the frame delay blocks 1A to 1D are read into the large-capacity field memory at its corresponding pixel positions, and, then, signal processing is performed to read out the still video image data for one picture area (FIG. 5) repeatedly to thereby achieve the display of the still video image.

When applying the present invention to a transmitting system using the MUSE system, it is required that the transmitter side transmits also a code signal to indicate whether the transmitted signal is that of the first to fourth fields or that of the fifth to eighth fields so that the above described signal processing system in the still video image transmitting mode may be set up on the receiver side.

In the still image transmitting method according to the present invention as described above, it is adapted such that two times as many fields as those transmitted in the prior art, the fields carrying information of a still video image, are transmitted so that the information which was skipped in the transmission of a still video image with the use of a signal bandwidth compression technique in the prior art is also transmitted and, on the receiver side, interframe interpolation is performed so that the still video image data before being subjected to the subsampling is output in the form of fields of data. Therefore, an advantage is obtained from the present invention in that a high definition video image transmission improved in its resolution, especially in the diagonal direction can be achieved.

What is claimed is:

1. A still image transmitting method for processing a video image comprising the steps of:
    converting said video image into digital image data;
    sub-sampling said converted digital image data for a picture area whereby pixel data of said digital image data of a still image is sampled at intervals of a predetermined period; and
    transmitting said sub-sampled digital image data of the still image of the picture area at sampling points in first selected positions as video information of a plurality of N fields, in which transmitting step, sub-sampled digital image data obtained in said sub-sampling step at sampling points in second selected positions different than said first selected positions is transmitted in a plurality of N fields that are contiguous to said N fields, so that pixel data at said first and second selected positions of said still image for the picture area is transmitted in a period equal to two times the number of N fields.

* * * * *